United States Patent [19]

Stege

[11] Patent Number: 5,183,170
[45] Date of Patent: Feb. 2, 1993

[54] FUEL TANK FOR MOTOR VEHICLES

[75] Inventor: Jürgen Stege, Rohrbach, Fed. Rep. of Germany

[73] Assignee: Audi A.G., Ingolstadt, Fed. Rep. of Germany

[21] Appl. No.: 573,023

[22] PCT Filed: Jan. 31, 1989

[86] PCT No.: PCT/EP89/00077
§ 371 Date: Aug. 3, 1990
§ 102(e) Date: Aug. 3, 1990

[87] PCT Pub. No.: WO89/07536
PCT Pub. Date: Aug. 24, 1989

[30] Foreign Application Priority Data

Feb. 12, 1988 [DE] Fed. Rep. of Germany ....... 3804407

[51] Int. Cl.[5] .............................................. B65D 3/18
[52] U.S. Cl. .................................................. 220/86.2
[58] Field of Search .................... 220/86.2, 562, 86.1; 141/337, 87

[56] References Cited

U.S. PATENT DOCUMENTS

| 2,010,445 | 8/1935 | Sparks | 220/86.2 |
| 2,153,199 | 4/1939 | Miller | 220/86.2 |
| 2,576,192 | 11/1951 | Poznik | 220/86.2 |
| 3,698,597 | 10/1972 | Burke | 220/86.2 |
| 4,122,968 | 10/1978 | Germain | 220/86.2 |
| 4,856,568 | 8/1989 | Murphy et al. | 220/86.2 |

*Primary Examiner*—Joseph Man-Fu Moy
*Attorney, Agent, or Firm*—Kane, Dalsimer, Sullivan, Kurucz, Levy, Eisele and Richard

[57] ABSTRACT

Fuel tank for motor vehicles, with a filling spout which is adjoined by a component which extends all the way to the tank bottom, the component consists of an open pore plastic foam material in whose pores the fuel flows to the tank bottom.

1 Claim, 1 Drawing Sheet

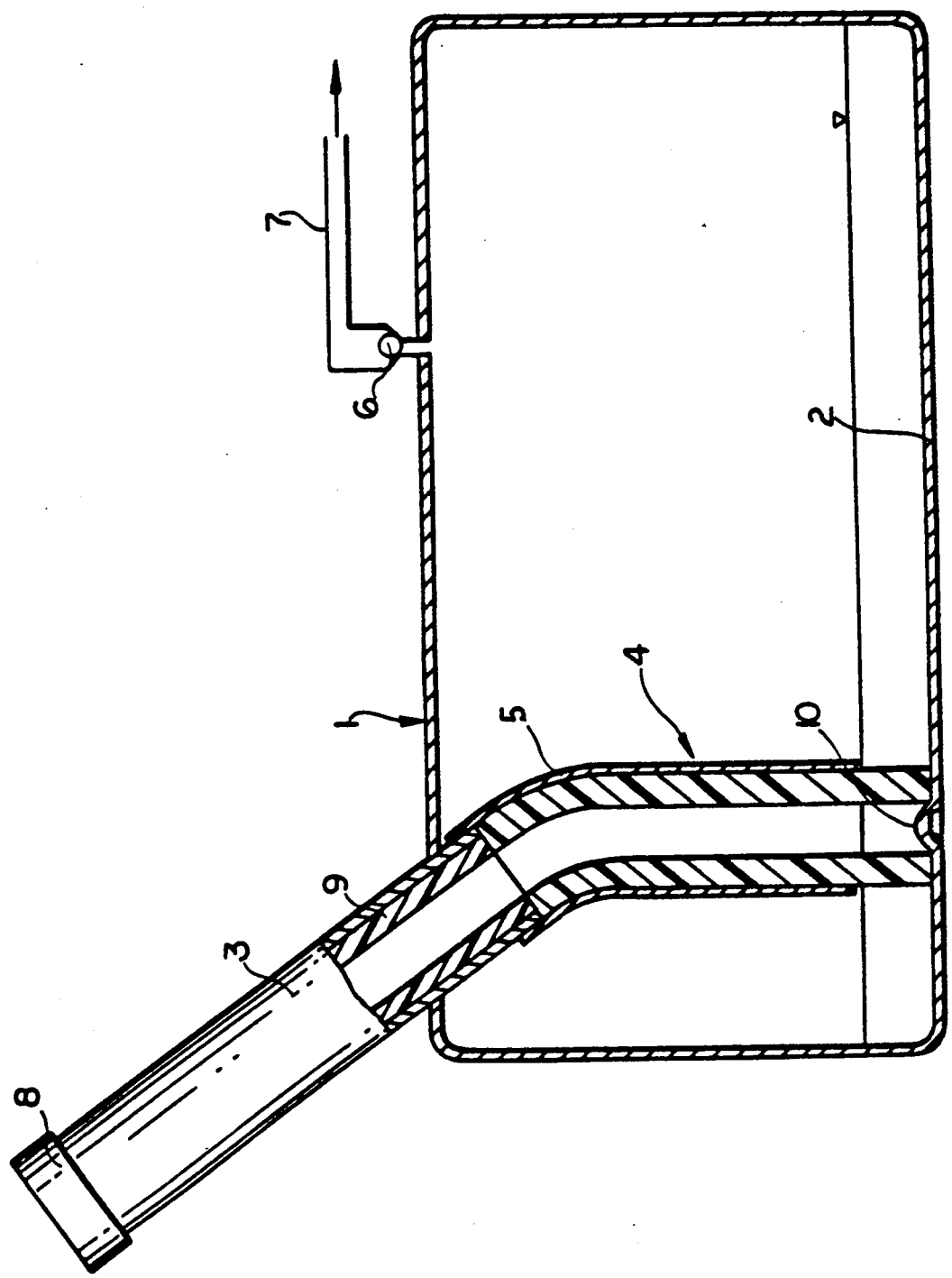

FUEL TANK FOR MOTOR VEHICLES

The invention relates to a fuel tank for motor vehicles in accordance with the introductory part of claim 1.

When such fuel tanks are being filled, a strong mixing action takes place between the fuel and the volume of air in the tank. As a result, the air displaced from the tank as it is filled contains a large percentage of hydrocarbons. Furthermore, severe frothing can occur, especially in the case of diesel fuels.

At the present time legal regulations are being considered for the prevention of the escape of fuel vapors into the atmosphere when tanking. To solve this problem complicated suction devices connected to the pump nozzles or valves in the filling spout are being proposed, which are pushed open by the pump nozzle and which have a gasket sealingly surrounding the pump nozzle. These solutions are complicated and they do not prevent the fuel from frothing in the tank and charging the air with fuel vapors which, when the internal combustion engine is started, have to be passed through active charcoal filters in the air intake system of the engine. The large amount of fuel vapors calls for a correspondingly large active charcoal filter whose containment within the engine compartment of the vehicle presents considerable problems.

Especially in order to prevent or reduce the frothing of the fuel when the tank is filled it is known (German Federal Pat. 34 37 475) to provide within the tank a fuel guiding surface extending in an arc from the end of the filling spout to close to the tank bottom. When the tank is filled the fuel no longer falls free from the end of the filling spout to the tank bottom or to the level of the fuel already in the tank, but is guided downward along this surface, to prevent or reduce the frothing of the fuel and the mixing of fuel vapors with the air in the tank. This purpose, however, can be achieved only partially, since when the tank is filled at comparatively high pressure the fuel is already partly agitated within the spout, and only a small part of it is in contact with the fuel guiding surface as it emerges from it.

The invention is addressed to the problem of creating a fuel tank of the generic type in which frothing of the fuel and charging the air volume with fuel vapors while filling is reduced and, on the other hand, the emission of air mixed with fuel vapors while filling is largely prevented.

U.S. Pat. No. 2,010,445 discloses a fuel tank having a filling spout adjoined by a tube which extends all the way to the tank bottom or terminates close to same. The tube is provide with longitudinal slits and surrounded by a sieve. The purpose of this known arrangement is to achieve a filtering of the fuel when the tank is being filled, without the danger that the sieve may be damaged by the nozzle of the pump gun. Frothing of the fuel and charging the air volume with fuel vapors when the tank is being filled cannot be prevented with this known arrangement, since during the filling the fuel strikes the edges of the longitudinal slits and is more greatly agitated. The fuel and fuel vapor pass transversely of the length of the tube through the longitudinal slits and through the sieve surrounding them, into the interior of the fuel tank, and while the tank is being filled the sieve is unable to prevent fuel vapors present inside of the fuel tank from passing through the sieve into the pump nozzle and thus into the atmosphere.

Setting out from U.S. Pat. No. 2,010,445, the invention addresses itself to the problem of creating a fuel tank of the generic type, in which frothing of the fuel and charging the air volume with fuel vapors will be reduced while tanking, and on the other hand the emission of air mixed with fuel vapors will be prevented insofar as possible while tanking.

This problem is solved in accordance with the invention by the features stated in the specific part of claim 1.

When the tank is being filled, the fuel flows from the filling spout through the open-pore component largely free of turbulence to the bottom of the tank. At the same time the fuel is guided downwardly in the pores. Since the open pores remain largely full of fuel, a gas blocking means is formed which prevents the air content of the fuel tank from issuing through the filling spout into the open air. It can be delivered in a conventional manner through a vent valve and an active carbon filter to the engine's air intake system. It is important to note that, due to the absence of turbulence in the fuel while filling, the air in the tank is charged only to a slight extent with fuel vapors.

The component of open-pore material should be provided at least partially, especially in sections not perpendicular, with a covering impermeable to gas and liquid, so as to prevent fuel from dripping from these section while the tank is being filled, and insofar as possible to prevent the penetration of air charged with fuel vapors through the porous wall into the interior of the tube.

Fuel-resistant, open-pore plastic foam has proven to be very suitable as material for the component. Preferably the component is a tube. The pore size, wall thickness and inside diameter of such a foam tube are selected such that the resistance to flow developed by the tube will be small enough to assure proper filling without backsurging.

Instead of an open-pore plastic foam a metal or plastic fiber mesh can be used as the open-pore material, especially in the case of a tube.

To prevent fuel turbulence within the filling spout, it may prove desirable to line the filling spout with an open-pore material.

An embodiment of the invention will be now be described with reference to the drawing in which a fuel tank is represented diagrammatically in cross section.

In the drawing, 1 indicates the fuel tank in which a filling tube 3 terminates at a distance from the tank bottom 2. The filling spout 3 is joined to a tube 4 which extends all the way to the tank bottom 2 or close to it. The tube 4 consists, for example, of a fuel-resistant, open-pore foam material. When the tank is being filled the fuel flows largely free of turbulence, downwardly into the foam wall of the tube 4. This largely prevents the development of fuel vapors and the mixing thereof with the air volume in the tank 1.

Preferably the foam wall of tube 4 is provided with a covering 5 impermeable to gas and liquid. This covering can be formed during the manufacture of the foam tube 4 by an impermeable outer skin or by a separate tubular body which can consist of plastic, but can also be made in some cases of metal. The covering 5 can extend over the entire length of tube 4 with the exception of a section at the bottom end of the tube, through which the fuel can pass into the tank. It may be sufficient, however, to provide the covering only in a nonperpendicular area, if any, of the tube 4 so as to prevent fuel from dripping out of this area.

Especially when it is clad in a covering 5, the tube 4 then forms and effective gas blocking means to prevent fuel vapor-charged air from escaping from the filling tube 3 when the tank is being filled. For venting, a venting tube 7 controlled by a valve 6 is preferable, which is connected through an active charcoal filter, not shown, to the air intake system of the engine. The venting of the fuel tank 1 during operation is accomplished by known means, for example a venting valve in the tank closure cap 8.

To prevent agitation of the fuel in the filling tube 3 itself, the latter can be provided with a porous lining 9. The filling spout 3 can be made as a unit with the tube 4 and inserted into the tank 1. To hold the bottom end of the tube 4 in place the tank bottom can be provided with an indentation 10.

Many variants of the embodiment represented are, of course, possible without departing from the scope of the invention. Thus, instead of the tube 4, a rod-like foam body extending from the spout 3 to the bottom of the bank can be provided instead of the tube 4; it must of course have such great porosity or such large probes that is resistance to flow will not be excessive. Alternatively, a tube of metal or plastic fiber mesh can also be used.

I claim:

1. Fuel tank for motor vehicles, with a filling spout (3) which is adjoined by a component (4) which extends all the way to the tank bottom (2) or terminates near same, characterized in that the component (4) consists of an open-pore plastic foam material in whose pores the fuel flows to the tank bottom (2).

* * * * *